Oct. 18, 1932.     V. V. MARTIN     1,883,806

COOKY DISPLAY JAR

Filed Nov. 16, 1931

Inventor,
Vernon V. Martin,
By Minturn & Minturn,
Attorneys.

Patented Oct. 18, 1932

1,883,806

UNITED STATES PATENT OFFICE

VERNON V. MARTIN, OF INDIANAPOLIS, INDIANA

COOKY DISPLAY JAR

Application filed November 16, 1931. Serial No. 575,269.

This invention relates to the art of containers of the type adapted to hold and display edible articles such as cookies. It is a purpose of my invention to provide a container, preferably made of glass to be transparent, to hold a number of cookies in such a manner that the cookies may be displayed to the buying public in a neat and sanitary manner.

Heretofore cookies have been packed in ordinary boxes or cartons when sold in bulk in a manner such that when a few were to be sold, it would be necessary to shift the cookies about in the box with the result that many of them became broken, and a general mussy appearance soon developed with the result that customers were not particularly attracted to the article. To overcome this situation, it is the purpose of my invention to arrange and display the cookies in vertical columns whereby it is necessary only to reach within the container and lift out the number of cookies desired from the top of any one column without having to disturb the remaining cookies in any way.

It is also a purpose of my invention to so form the container that a new supply may be readily and easily placed therein and that the individual columns of the cookies will be maintained as such without danger of the columns being upset.

Figure 2:
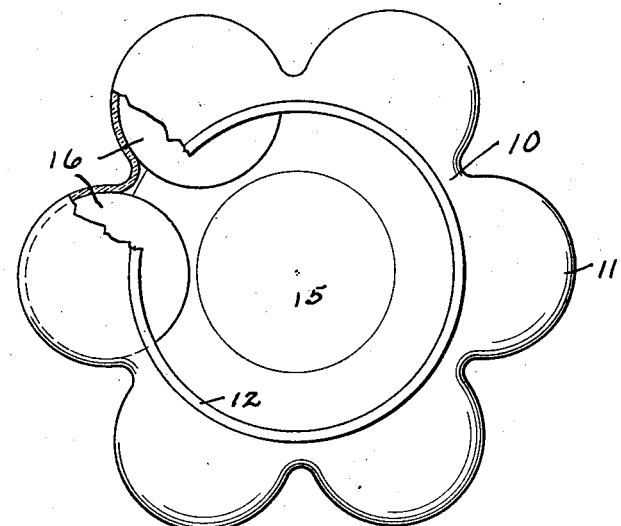
Figure 1:
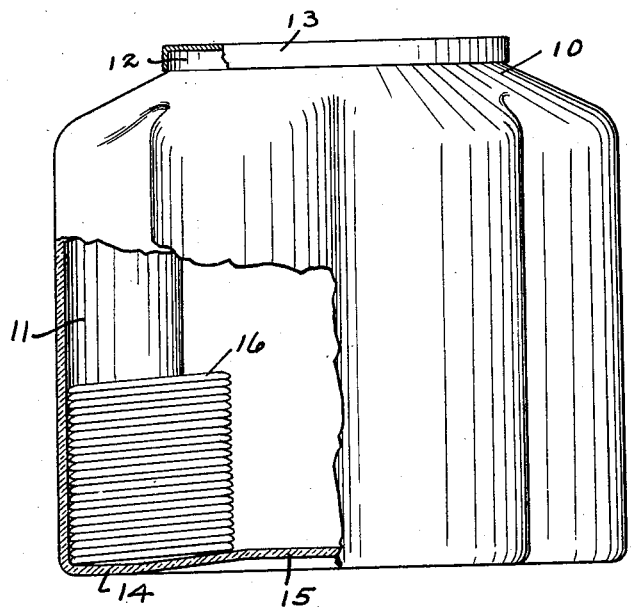

These and other purposes will become apparent in the following description of the invention as illustrated by the accompanying drawing, in which Fig. 1 is a fragmentary side elevation of a container or jar embodying my invention, and Fig. 2, a fragmentary top plan view.

Like characters of reference indicate like parts in the two views in the drawing.

I form a jar 10, preferably of transparent glass, to have the circumferential wall thereof corrugated or regularly indented to define substantially semi-circular projections therearound defining corresponding semi-circular hollow columns within the jar, the inner sides of which columns are open toward the central portion of the jar. In the accompanying drawing I show six of such columns or compartments 11 regularly spaced around the jar. The upper portion of the jar 10 is drawn inwardly to terminate with an upturned lip 12 adapted to receive thereover a cover 13. The base 14 of the jar 10 is centrally raised so as to have the center 15 at a higher elevation than that of the base portion at the bottom of each of the compartments 11.

The interior curvature of each of the compartments 11 is made to receive therein cookies 16 which may be stacked one above the other in each of the compartments flat sides down toward the base of the jar. Since the base 14 is higher toward the center than it is at the outer edge, the inner edges of the cookies will be raised whereby the entire column of cookies within any one compartment 11 will tend to be tilted outwardly into contact with the vertical wall of the compartment. By so forming the compartment 11 as above indicated, a comparatively large opening is left down through the central portion of the jar 10 after all the compartments are filled with cookies. Any one compartment may be filled or emptied by inserting one's hand down into the jar centrally thereof and placing in or lifting out the cookies as may be the case without disturbing or bumping into the cookies in any of the other compartments. What crumbs may be formed by particles of the cookies breaking off will be within the central portion of the jar rather than at the outer edges and only the cookies as stacked within each of the compartments will be observed by the prospective customer.

It is thus evident that my invention provides for an improved form of container adapted to give storage space and provide a neat and sanitary display of cookies.

While I have herein described and shown one particular form of the invention, it is observed that structural changes may be made without departing from the spirit of the invention, and I therefore do not desire to be limited to that precise form beyond the limitations as may be imposed by the following claims.

I claim:

1. A container having a plurality of column-like compartments spaced around and opening into a common central well the width of said opening being not less than the major width of the compartment whereby cookies and the like may be lowered through the central well and positioned selectively within the compartments by an edgewise movement of the cookies in a plane substantially at right angles with the longitudinal axis of its compartment.

2. A container having a plurality of column-like compartments spaced around and opening into a common central well whereby cookies and the like may be lowered through the central well and positioned selectively within the compartments, and a floor across each compartment having the side toward said well higher than on the opposite side.

3. A container generally cylindrical in shape, the outer vertical wall thereof being corrugated by spaced vertically aligned indentations to define a plurality of hollow column-like compartments around the container each opening within the container between said indentations and means to tilt the cookies toward the outer wall of these compartments.

4. A container generally cylindrical in shape, the outer vertical wall thereof being corrugated by spaced vertically aligned indentations to define a plurality of hollow column-like compartments around the container each opening within the container between said indentations, and a bottom across the underside of the container including said compartments, said bottom being raised adjacent the openings into said compartments.

5. A container generally cylindrical in shape having a plurality of protuberances therearound each extending vertically of the side wall and being substantially semi-circular in cross section, and a bottom in the container centrally raised to slope outwardly and downwardly into each of said protuberances.

In testimony whereof I affix my signature.

VERNON V. MARTIN.